United States Patent
Stanjek et al.

(10) Patent No.: US 9,309,437 B2
(45) Date of Patent: Apr. 12, 2016

(54) COATING COMPOSITION FOR SEALING SURFACES

(75) Inventors: Volker Stanjek, Ampfing (DE); Bernd-Josef Bachmeier, Haiming (DE); Andreas Bauer, Kirchdorf (DE)

(73) Assignee: WACKER CHEMIE AG, Munich (DE)

( * ) Notice: Subject to any disclaimer, the term of this patent is extended or adjusted under 35 U.S.C. 154(b) by 221 days.

(21) Appl. No.: 13/640,457

(22) PCT Filed: Apr. 11, 2011

(86) PCT No.: PCT/EP2011/055622
§ 371 (c)(1),
(2), (4) Date: Oct. 10, 2012

(87) PCT Pub. No.: WO2011/131506
PCT Pub. Date: Oct. 27, 2011

(65) Prior Publication Data
US 2013/0029037 A1    Jan. 31, 2013

(30) Foreign Application Priority Data
Apr. 23, 2010  (DE) .......................... 10 2010 028 143

(51) Int. Cl.
| | | |
|---|---|---|
| *C08G 65/336* | (2006.01) | |
| *C09D 167/00* | (2006.01) | |
| *C09D 133/00* | (2006.01) | |
| *C09D 171/02* | (2006.01) | |
| *C09D 183/04* | (2006.01) | |
| *C08K 3/20* | (2006.01) | |
| *C08K 3/26* | (2006.01) | |

(52) U.S. Cl.
CPC ............ *C09D 167/00* (2013.01); *C08G 65/336* (2013.01); *C09D 133/00* (2013.01); *C09D 171/02* (2013.01); *C09D 183/04* (2013.01); *C08K 3/20* (2013.01); *C08K 2003/265* (2013.01)

(58) Field of Classification Search
None
See application file for complete search history.

(56) References Cited

U.S. PATENT DOCUMENTS

| 7,527,870 B2 * | 5/2009 | Beger et al. .................... 428/447 |
|---|---|---|
| 2005/0119436 A1 | 6/2005 | Ziche et al. |
| 2009/0131591 A1 | 5/2009 | Schindler et al. |
| 2009/0318599 A1 * | 12/2009 | Brokamp ...................... 524/261 |
| 2010/0016537 A1 | 1/2010 | Bamann et al. |
| 2010/0081757 A1 * | 4/2010 | Braun et al. ................... 524/537 |

FOREIGN PATENT DOCUMENTS

| CN | 101353479 A | 1/2009 |
|---|---|---|
| CN | 101443381 A1 | 5/2009 |
| DE | 102006022834.4 A1 | 11/2007 |
| EP | 1535940 A1 | 6/2005 |
| EP | 1695989 A1 | 8/2006 |
| EP | 2135852 A1 | 12/2009 |
| JP | 2009191130 | 8/2009 |
| KR | 10 2009 008469 | 1/2009 |
| WO | 2006/136261 A1 | 12/2006 |
| WO | 2007/093382 A1 | 8/2007 |
| WO | 2007131986 A2 | 11/2007 |
| WO | 2008077510 A1 | 7/2008 |

OTHER PUBLICATIONS

"Kinetics of Hydrolysis and Self Condensation Reactions of Silanes by NMR Spectroscopy" authored by Salon et al. and published in Colloids and Surfaces A Physicochem. Eng. Aspects (2008) 312, 83-91.*
English abstract of JP 2009-191130 A.

* cited by examiner

*Primary Examiner* — Marc Zimmer
(74) *Attorney, Agent, or Firm* — Brooks Kushman P.C.

(57) ABSTRACT

Weather resistant and water repellent surfacing compositions especially useful in roofing applications contain an alkoxysilane-terminated polymer and a reactive silane plasticizer containing a $C_{6-40}$ hydrocarbon group. The surfacing compositions are of low viscosity and may be used without non-reactive plasticizers or organic solvents.

18 Claims, No Drawings

US 9,309,437 B2

COATING COMPOSITION FOR SEALING SURFACES

CROSS-REFERENCE TO RELATED APPLICATIONS

This application is the U.S. national phase of PCT Appln No. PCT/EP2011/055622 filed Apr. 11, 2011, which claims priority to German Patent Application No. 10 2010 028 143.3 filed Apr. 23, 2010, which are incorporated herein by reference.

BACKGROUND OF THE INVENTION

1. Field of the Invention

The invention relates to a moisture-curing coating composition comprising a silane-terminated polymer and to a method for sealing surfaces.

2. Description of the Related Art

It is massively important to seal organic and inorganic building materials such as wood or concrete internally and externally on buildings or on the roof, against the penetration of water, in order to prevent destruction of the materials over time.

On complex roofs with copious detailing, many sealing materials frequently used in the past, such as bitumen sheets, have almost entirely disappeared, on account of the very great difficulty of sealing angles and edges. This problem was subsequently solved by the use of molten bitumen, but only at the expense of other hazards for the operator, through toxic vapors and through operation with the very hot liquid. VOC limitations and toxicological considerations have seen other solutions formerly in use, such as solvent-borne bitumen systems, being replaced by different technologies.

Nowadays, water-based coating materials such as acrylate-modified or polymer-modified bitumen emulsions are used primarily, although one- and two-component polyurethane systems as well continue to play a significant part, in roof sealing, for example.

A major disadvantage of aqueous emulsions is the physical drying of the materials, which becomes very slow particularly below a temperature of 15° C. Conversely, drying at the surface is comparatively rapid above 25° C., with the associated possibility of inclusions of water and, subsequently, formation of bubbles. In this way, weak points are formed in the coating, and can lead to leaks.

One-component, polyurethane-based sealing systems commonly comprise large amounts of solvent in order to lower the viscosity to an acceptable level for brush application or roll application in the roof region. Two-component polyurethane systems are very expensive by comparison and necessitate a complicated application technology. All polyurethane sealing systems include highly toxic isocyanate compounds, whose use is viewed critically in virtually all home applications, and also in many professional applications.

RTV-1 silicone coating formulations such as acetate systems or oxime systems give off elimination products in the course of curing that have a poor odor or even are harmful to health, such as acetic acid or oxime, for example. Other disadvantages of these materials are the poor adhesion to a large number of building materials, the poor recoatability, and the inadequate weathering stability.

One-component, moisture-curing coating materials based on MS Polymers (silane-terminated polyethers prepared by a particular process) are known in the form of sealing materials for application in the construction sector, from EP 1 695 989 A, WO 2007/093382, and WO 2008/077510.

Furthermore, EP 2135852 describes formulations based on silane-terminated polymers, prepared by reactions of polyols and isocyanate-functional polymers, that additionally comprise aminoalkylalkoxysilanes as well and also a relatively small amount, i.e., preferably 1% to 5% by weight, of alkylalkoxysilanes without an additional reactive organic function.

However, all of the known products have disadvantages, these disadvantages being massive in some cases. For instance, a feature common to all formulations based on conventional silane-crosslinking prepolymers is that they are relatively slow to react—in other words, for a reasonable skinning time and a passable volume curing, they usually require tin catalysts. MS Polymer-based formulations have the disadvantage, moreover, of possessing a substantial residual tack. This leads to rapid soiling and is unwanted as a consequence, particularly in applications in the roof region. In addition, in order to attain acceptable mechanical properties, MS Polymer-based formulations need to contain more than 25% by weight of MS Polymers, as a comparatively expensive formulation ingredient, as known from WO 2007/093382.

The major disadvantage of all the known systems, however, lies in the high viscosities of the silane-crosslinking prepolymers used. In order to obtain sprayable, rollable or spreadable formulations, therefore, it is generally necessary to add organic solvents and/or large amounts of plasticizers with a diluent effect. Solvents, as volatile organic constituents, are unwanted for environmental reasons. Plasticizers, for their part, may "exude" from the product over the course of time, which may likewise be extremely problematic.

SUMMARY OF THE INVENTION

An object of the invention was to provide a one-component, moisture-curing, isocyanate-free and bitumen-free composition which is suitable for sealing surfaces, especially exterior and interior building surfaces, roofs, and the like, and which no longer has the disadvantages described above. These and other objects are achieved by a composition containing an alkoxysilyl-terminated polymer, a reactive plasticizer, and a curing catalyst.

DETAILED DESCRIPTION OF THE PREFERRED EMBODIMENTS

The invention provides a moisture-curing coating composition (C), comprising

A) 100 parts by weight of silane-terminated polymer (P) having end groups of the general formula (I)

$$-A-Si(OR^1)_x R^2_{3-x} \quad (I),$$

B) 7 to 200 parts by weight of reactive plasticizer (RW) of the general formula (II),

$$R^3-Si(OR^4)_y R^5_{3-y} \quad (II),$$

C) 0 to 400 parts by weight of filler (F), and
D) 0.01 to 20 parts by weight of curing catalyst (K), where
  A is a linear or branched alkylene group having 1 to 10 carbon atoms,
  $R^1$ and $R^4$ are each a linear or branched, unsubstituted or halogen-substituted alkyl group having 1 to 10 carbon atoms,
  $R^2$ and $R^5$ are each a linear or branched, unsubstituted or halogen-substituted alkyl group having 1 to 5 carbon atoms, R³ is an aryl group or a linear, branched or cyclic alkyl group or alkenyl group having 6 to 40 carbon atoms, in which individual hydrogen atoms may be substituted by organic radicals, and, if R³ is a linear, branched or cyclic alkyl group or alkenyl group, the carbon chain may be interrupted by oxygen atoms, and x and y are 1, 2 or 3.

The moisture-curing coating composition (C) is outstandingly suitable for sealing surfaces against the penetration of water or water vapor. It requires only little amounts, or none at all, of organic plasticizers, and contains no volatile solvents. It is nevertheless of sufficiently low viscosity to be able to be applied, without problems, by brushing, rolling or spraying. Moreover, it does not require metal-containing catalysts, such as tin-containing catalysts, and requires comparatively small amounts of crosslinkable polymers. It cures to form tack-free coatings.

The invention is based first on the surprising finding that the plasticizers (RW) can be added to the moisture-curing coating compositions (C) even in concentrations of more than 5% by weight without this addition impairing important product properties. Thus, comparatively large additions of conventional alkoxysilanes—that is, of noninventive alkoxysilanes of the general formula (II), in which R³ is an alkyl group or an organofunctional alkyl group (e.g., aminopropyl group) having less than 6 carbon atoms—usually lead, on curing of the sealant, to instances of embrittlement and to the formation of surfaces which are not smooth and even. Moreover, such coatings in the cured state exhibit reduced elongation at break and also, particularly in the case of organofunctional silanes, exhibit relatively poor hydrophobicity and hence water repellency properties.

Second, the invention is based on the finding that by adding the reactive plasticizers (RW) it is possible to achieve a combination of a plurality of positive product properties. To start with, for instance, the reactive plasticizers (RW) considerably lower the viscosity of the coating compositions (C). Since, however, they are incorporated chemically into the network that forms during the curing of the coating composition (C), the reactive plasticizers neither are volatile nor can exude from the cured sealant. At the same time they increase the hydrophobicity and hence the water repellency of the cured coating composition.

The coating composition (C) preferably has a viscosity at 20° C. of not more than 20,000 mPa·s, with viscosities of not more than 10,000 mPa·s being preferred and viscosities of not greater than 5000 mPa·s being particularly preferred.

The polymers (P) preferably comprise end groups of the general formula (IV)

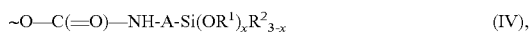

$\sim$O—C(=O)—NH-A-Si(OR¹)$_x$R²$_{3-x}$ (IV), in which all of the variables have the definitions indicated for the general formula (I).

A is preferably a propylene or methylene group. The methylene group is particularly preferred, on account of its high moisture reactivity. Formulations comprising polymers (P) having end groups of the general formula (IV) in which A is a methylene group have the advantage that they can be cured preferably without metal catalysts and more particularly without tin-containing catalysts.

It is of course also possible to use mixtures of two or more polymers (P) having end groups of the general formulae (I) and/or (IV) in which A, R¹, R² and x have different definitions, examples being polymers (P) in which R¹ stands in part for methyl radicals and in part for ethyl radicals, and/or A stands in part for propylene groups and for methylene groups.

The moisture-curing coating compositions (C) preferably comprise polymers (P) having end groups of the general formula (I) or, more preferably, end groups of the general formula (IV) in a concentration of at least 5% by weight, more preferably at least 8% by weight, and most preferably at least 10% by weight, and preferably not more than 50% by weight, more preferably not more than 40% by weight, and most preferably not more than 25% by weight.

The reactive plasticizer (RW) conforms preferably to the general formula (V)

R⁶—Si(OR¹)$_x$R²$_{3-x}$ (V), in which

R⁶ is a substituted or unsubstituted, linear or branched alkyl group having 8 to 40 carbon atoms, in which the carbon chain may be interrupted by oxygen atoms, and all other variables have the definitions indicated for the general formula (I) as in claim 1.

Preferably R⁶ is a pure branched or unbranched hydrocarbon radical having 8 to 20 carbon atoms. Particularly preferred radicals R⁶ are isooctyl, octyl, decyl, dodecyl, tetradecyl, and more particularly hexadecyl radicals.

The moisture-curing coating compositions (C) preferably comprise reactive plasticizers (RW) having end groups of the general formula (II) or, more preferably, end groups of the formula (V) in a concentration of not more than 40% by weight, more preferably not more than 30% by weight, and preferably at least 10% by weight, more preferably at least 15% by weight.

The moisture-curing coating compositions (C) preferably comprise at least 15 parts by weight, more preferably at least 30 parts by weight, and most preferably at least 50 parts by weight, and preferably not more than 150 parts by weight, and more preferably not more than 100 parts by weight, of reactive plasticizer (RW) of the general formula (II).

Examples of alkyl radicals R¹, R², R⁴ and R⁵ are the methyl, ethyl, n-propyl, isopropyl, n-butyl, isobutyl or tert-butyl radicals.

R¹ and R⁴ are preferably methyl or ethyl radicals.

R² and R⁵ are preferably methyl radicals.

x and y are preferably 2 or 3.

Examples of polymers (P) which comprise the end groups of the general formula (I) are preferably polyesters, polyethers, polyalkylenes or polyacrylates. Particularly preferred is a linear polyether, such as a polypropylene oxide. The average molecular weights $M_n$ of the polymers (P) are preferably at least 2000 g/mol, more preferably at least 4000 g/mol, and most preferably at least 10,000 g/mol, and preferably not more than 25,000 g/mol, more preferably not more than 20,000 g/mol, and most preferably not more than 19,000 g/mol. The viscosity of the polymers (P) is preferably at least 0.2 Pa·s at 20° C., more preferably at least 1 Pa·s at 20° C., and most preferably at least 5 Pa·s at 20° C., and preferably not more than 100 Pa·s at 20° C., and more preferably not more than 40 Pa·s at 20° C. The polymers (P) are preferably prepared by processes of the kind described in WO 2006/136261, EP 1 535 940 A1 or WO 2007/131986.

Serving as a basis of the coating compositions (C) of the invention are preferably silane-terminated polyethers, more particularly silane-terminated polypropylene glycols, having dimethoxymethylsilyl, trimethoxysilyl, diethoxymethylsilyl or triethoxysilyl end groups of the formula (IV), with different viscosities.

Remarkably, the coating formulations (C) of the invention based on silane-terminated polymers (P) having end groups of the general formula (IV) cure to completely tack-free coatings and thus differ significantly from silane-crosslinking sealing systems based on the so-called MS Polymers, as are described in the prior art.

Furthermore, it has surprisingly been found that the coating formulations (C) of the invention based on silane-terminated polymers (P) having end groups of the general formula (IV) undergo effective volume curing with comparatively low levels of polymers (P), and that the cured coatings possess sufficient mechanical properties.

A further advantage when using coating compositions (C) with silane-terminated polymers (P) having end groups of the general formula (IV) lies in the fact that they require very small amounts, or none, of metal-containing, more particularly tin-containing, catalysts in order to attain a sufficient curing rate. This is so especially when the polymers (P) have at least 40 mol %—preferably at least 50 mol %—of polymer molecules having end groups of the general formula (IV) in which A is a methylene group, since the end group, as already described, possesses a particularly high reactivity. Claimed with particular preference, therefore, are coating compositions (C) based on polymers (P) with the corresponding composition.

Examples of reactive plasticizers (RW) are all silanes having alkyl groups $R^5$ having at least 6, preferably at least 8, carbon atoms. On account of their readier availability, preference is given here to silanes of the general formula (V) having alkyl groups $R^5$ with an even number of carbon atoms. Examples include isooctyltrimethoxysilane, isooctyltriethoxysilane, N-octyltrimethoxysilane, N-octyltrimethoxysilane, decyl-trimethoxysilanes, decyltriethoxysilane, dodecyltrimethoxysilane, dodecyltriethoxysilane, tetradecyltrimethoxysilane, tetradecyltriethoxysilane, hexadecyltrimethoxysilane, hexadecyltriethoxysilane, and also silanes with even longer alkyl groups.

Examples of fillers (F) are aluminum trihydroxide, calcium carbonate, barium sulfate, talc, mica, kaolin, silica, quartz, heavy spar and carbon black.

One preferred filler (F) is calcium carbonate. Preferred calcium carbonate types are ground or precipitated and optionally surface-treated with fatty acids such as stearic acid or its salts. The composition (C) preferably contains preferably at least 10% by weight, more preferably at least 20% by weight, and preferably not more than 75% by weight, more preferably not more than 70% by weight, and most preferably not more than 65% by weight of calcium carbonate.

The moisture-curing coating compositions (C) preferably comprise at least 20 parts by weight, yet more preferably at least 30 parts by weight, more particularly at least 60 parts by weight, and with particular preference at least 100 parts by weight, and preferably not more than 300 parts by weight, more preferably not more than 200 parts by weight, of filler (F).

Particularly preferred fillers (F) are talc and aluminum hydroxide. These two types of filler possess the advantage of increasing the viscosity of the resultant coating composition (C) much less strongly in comparison to other fillers. The composition (C) preferably comprises at least 10% by weight, more preferably at least 20% by weight, and preferably not more than 75% by weight, more preferably not more than 70% by weight, and most preferably not more than 65% by weight, of talc and/or aluminum hydroxide.

Another particularly preferred filler (F) is silica, more particularly fumed silica. With very particular preference the composition (C) comprises not only silica, more particularly fumed silica, but also other fillers (F), with calcium carbonate being preferred. In that case the composition (C) comprises silica, more particularly fumed silica, preferably in amounts of at least 0.1% by weight, more preferably at least 0.4% by weight, and preferably not more than 10% by weight, more preferably not more than 5% by weight, and aluminum trihydroxide in the amounts indicated above. In place of the aluminum trihydroxide it is also possible to use talc, calcium carbonate or else mixtures of aluminum trihydroxide, talc and/or calcium carbonate. The amount of all fillers (F) together is not more than 80% by weight.

A further preferred composition (C) is transparent and comprises exclusively silica, more particularly fumed silica, as filler (F), preferably in amounts of 5% to 50% by weight.

Examples of metal-containing curing catalysts (K) are organic titanium and tin compounds, examples being titanic esters, such as tetrabutyl titanate, tetrapropyl titanate, tetraisopropyl titanate, and titanium tetraacetylacetonate; tin compounds, such as dibutyltin dilaurate, dibutyltin maleate, dibutyltin diacetate, dibutyltin dioctanoate, dibutyltin acetylacetonate, dibutyltin oxides, and corresponding dioctyltin compounds.

Examples of metal-free curing catalysts (K) are basic compounds, such as aminosilanes, examples being 3-aminopropyltrimethoxysilane, 3-aminopropyltriethoxysilane, 3-aminopropylmethyldimethoxysilane, 3-aminopropylmethyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminopropyltriethoxysilane, cyclohexylaminomethyltriethoxysilane, cyclohexylaminomethylmethyldiethoxysilane, cyclohexyl-aminomethyltrimethoxysilane, cyclohexylaminomethyl-methyldimethoxysilane, 3-cyclohexylaminopropyl-trimethoxysilane and 3-cyclohexylaminopropyl-triethoxysilane, or else other organic amines, such as triethylamine, tributylamine, 1,4-diazabicyclo-[2.2.2]octane, 1,5-diazabicyclo[4.3.0]non-5-ene, 1,8-diazabicyclo[5.4.0]undec-7-ene, N,N-bis(N,N-dimethyl-2-aminoethyl)methylamine, N,N-dimethylcyclohexylamine, N,N-dimethylphenylamine, and N-ethylmorpholinine; acidic compounds, such as phosphoric acid and its esters, toluenesulfonic acid, sulfuric acid, nitric acid or else organic carboxylic acids, examples being acetic acid, benzoic acid.

The curing catalysts (K) may be used both in pure form and in mixtures.

One preferred combination of different curing catalysts (K) is represented by the simultaneous use of aminosilanes and dialkyltin compounds. In this case the coating composition (C) may comprise one or more tin-containing curing catalysts (K), preferably in amounts of preferably not more than 0.5% by weight, more preferably not more than 0.2% by weight, and most preferably not more than 0.1% by weight.

With particular preference, however, the coating compositions (C) of the invention are completely tin-free. Serving as catalyst (K) in this case are preferably aminosilanes, mixtures of different aminosilanes, or else mixtures of aminosilanes with other metal-free compounds.

The coating composition (C) preferably comprises one or more curing catalysts (K), more preferably metal-free curing catalysts, preferably in total amounts of at least 0.01% by weight, more preferably at least 0.05% by weight, and preferably not more than 4% by weight, more preferably not more than 2% by weight.

The moisture-curing coating compositions (C) comprise preferably not more than 10 parts by weight, more preferably not more than 5 parts by weight, and most preferably not more than 1 part by weight of curing catalysts (K).

A tin-free composition of the coating compositions (C) is obtained preferably by using polymers (P) having end groups of the general formula (IV) in which A is a methylene group. Using tin-free coating compositions (C) based on these polymers therefore constitutes one particularly preferred embodiment of the invention.

The coating compositions (C) may comprise preferably up to 20 parts by weight, more particularly up to 10 parts by weight of one or more water scavengers (W). Examples of water scavengers (W) are silanes such as vinyltrimethoxysilane, vinyltriethoxysilane, vinyl-methyldimethoxysilane, O-methylcarbamatomethylmethyl-dimethoxysilane, O-methylcarbamatomethyltrimethoxysilane, O-ethylcarbamatomethylmethyldiethoxysilane, O-ethylcarbamatomethyltriethoxysilane, 3-methacryloyloxy-propyltrimethoxysilane, methacryloyloxymethyltri-methoxysilane, methacryloyloxymethylmethyldimethoxysilane, methacryloyloxymethyltriethoxysilane, methacryloyloxymethylmethyldiethoxysilane, 3-acryloyl-oxypropyltrimethoxysilane, acryloyloxymethyltrimethoxysilane, acryloyloxymethylmethyldimethoxysilanes, acryloyloxymethyltriethoxysilane, acryloyloxymethyl-methyldiethoxysilane, aminosilanes, it being possible to make use, among others, of the same aminosilanes already described as catalysts (K); and ortho esters, such as 1,1,1-trimethoxyethane, 1,1,1-triethoxyethane, trimethoxymethane, triethoxymethane, and related compounds.

The coating compositions (C) comprise preferably at least 0.1% by weight, more preferably at least 0.5% by weight, and preferably not more than 5% by weight, more preferably not more than 2% by weight of one or more water scavengers (W).

The coating compositions (C) may preferably comprise up to 20 parts, more preferably up to 10 parts by weight of one or more adhesion promoters (H). Examples of adhesion promoters (H) are aminosilanes, it being possible to use, among others, the same aminosilanes already described as catalysts (K). Epoxy silanes such as glycidyloxypropylmethyldimethoxysilane, glycidyloxypropyltriethoxysilane or glycidyloxypropylmethyldiethoxysilane, and also other silanes having organofunctional groups, such as, for example, 2-(3-triethoxysilylpropyl)maleic anhydride, N-(3-trimethoxysilylpropyl)urea, N-(3-triethoxysilylpropyl)urea, N-(trimethoxysilylmethyl)-urea, N-(methyldimethoxysilylmethyl)urea, N-(3-triethoxysilylmethyl)urea, N-(3-methyldiethoxysilyl-methyl)urea, O-methylcarbamatomethylmethyl-dimethoxysilane, O-methylcarbamatomethyltrimethoxysilane, O-ethylcarbamatomethylmethyldiethoxysilane, O-ethylcarbamatomethyltriethoxysilane, 3-methacryloyloxy-propyltrimethoxysilane, methacryloyloxymethyl-trimethoxysilane, methacryloyloxymethylmethyldimethoxysilane, methacryloyloxymethyltriethoxysilane, methacryloyloxymethylmethyldiethoxysilane, 3-acryloyl-oxypropyltrimethoxysilane, acryloyloxymethyltrimethoxysilane, acryloyloxymethylmethyldimethoxysilanes, acryloyloxymethyltriethoxysilane, and acryloyloxy-methylmethyldiethoxysilane, may be used as adhesion promoters.

The coating composition (C) comprises one or more adhesion promoters (H) in amounts of preferably at least 0.01% by weight, more preferably at least 0.5% by weight, and preferably not more than 5% by weight, more preferably not more than 2% by weight.

Where aminosilanes are used as curing catalysts (K), they preferably also serve simultaneously as water scavengers (W) and/or adhesion promoters (H). The amount of aminosilanes in the coating compositions of the invention is preferably at least 0.01% by weight, more preferably at least 0.5% by weight, and preferably not more than 5% by weight, more preferably not more than 3% by weight.

The moisture-curing coating compositions (C) comprise preferably up to 100 parts, more preferably up to 50 parts, by weight of one or more tetraalkoxysilanes (TS) of the general formula (III)

$$\mathrm{Si(OR^6)_4} \qquad \qquad \text{(III),}$$

in which $R^6$ is a linear or branched, optionally halogenated alkyl group having 1 to 10 carbon atoms, and/or partial condensates of the tetraalkoxysilanes (TS).

In the coating compositions (C) it is preferred to use tetraethoxysilane and more preferably partial condensates of tetraethoxysilane having an average degree of condensation of 1.5-15, more preferably having an average degree of condensation of 3 to 8. The amount of tetraalkoxysilanes (TS) of the general formula (III) and/or of partial condensates of these tetraalkoxysilanes in the coating compositions (C) is preferably at least 0.01% by weight, more preferably at least 0.5% by weight, and preferably not more than 20% by weight, more preferably not more than 10% by weight.

The coating compositions (C) may comprise further substances customary for moisture-curing coating compositions. These substances include nonreactive plasticizers, rheological additives, stabilizers such as antioxidants and UV stabilizers, fungicides, pigments, flame retardants, and solvents.

The coating composition (C) may preferably comprise up to 50 parts, more preferably up to 10 parts by weight of one or more plasticizers, preferably nonreactive plasticizers such as phthalic esters (e.g., dioctyl phthalate, diisooctyl phthalate, diundecyl phthalate, etc.), perhydrogenated phthalic esters (e.g., diisononyl 1,2-cyclohexanedicarboxylate, dioctyl 1,2-cyclohexanedicarboxylate, etc.), adipic esters (e.g., dioctyl adipate, etc.), benzoic esters, glycol esters, esters of saturated alkanediols (e.g., 2,2,4-trimethyl-1,3-pentanediol monoisobutyrates, 2,2,4-trimethyl-1,3-pentanediol diisobutyrates), phosphoric esters, sulfonic esters, polyesters, polyethers (e.g. polyethylene glycols, polypropylene glycols, etc.), polystyrenes, polybutadienes, polyisobutylenes, paraffinic hydrocarbons, and branched hydrocarbons of high molecular weight. The total amount of all plasticizers present in the composition (C) is preferably not more than 30% by weight, more preferably not more than 20% by weight, and most preferably not more than 10% by weight.

The coating formulation (C) of the invention may comprise one or more rheological additives, such as, for example, hydrophilic fumed silica, coated hydrophobic fumed silica, precipitated silica, polyamide waxes, hydrogenated castor oils, stearates, and precipitated calcium carbonates, which are preferably used in amounts of at least 0.1% by weight, more preferably at least 0.5% by weight, and preferably not more than 10% by weight, more preferably not more than 5% by weight.

The coating formulation (C) of the invention may further comprise stabilizers, such as light stabilizers (e.g., HALS compounds), fungicides, flame retardants, pigments, solvents, or other additives typical of one-component, silane-crosslinking systems.

The following coating composition (C) is preferred:
13% to 35% by weight of silane-terminated polymers (P)
6% to 30% by weight of reactive plasticizers (RW)
10% to 70% by weight of aluminum trihydroxide, talc, mica or calcium carbonate,
0.5% to 4% by weight of water scavengers (W)

0.05% to 3% by weight of curing catalysts (K), more particularly tin-free curing catalysts
0.1% to 5% by weight of adhesion promoters (A)
0.1% to 10% by weight of tetraalkoxysilanes (TS)
0% to 20% by weight of plasticizers
0% to 5% by weight of rheological additives
0% to 5% by weight of stabilizers and pigments
0% to 30% by weight of flame retardants
0% to 10% by weight of solvents,
the total amounts adding up to 100% by weight.

The amount of reactive plasticizer (RW) in this preferred coating composition (C) is preferably more than 10% by weight, more preferably at least 15% by weight.

In one preferred embodiment the coating compositions (C) of the invention are solvent-free. In a particularly preferred embodiment, the coating compositions (C) of the invention are solvent-free and plasticizer-free.

The coating compositions (C) may be prepared by techniques and mixing methods of the kind customary for producing moisture-curing coating compositions.

A method for sealing surfaces, wherein a coating composition (C) of the invention is applied to the surface to be sealed, is likewise provided by the invention. Application in this case takes place preferably by means of brush, roller, doctor or commercial spraying equipment such as airless equipment.

The coating compositions (C) of the invention are applied preferably in a film thickness of 0.1 to 5 mm.

The coating compositions (C) of the invention and the method of the invention are suitable for sealing surfaces against the penetration of water. They are suitable for sealing surfaces of exterior building surfaces, interior building areas (e.g., in wet rooms, in which case the coated surfaces thereafter may also be lined with tiles or other decorative materials), roofs and the like. Furthermore, the coating compositions (C) of the invention may also be used as damping and acoustic insulation material.

Examples of surfaces to which the coating compositions (C) of the invention may be applied are mineral building materials, metals, roofing felts, plastics, woven fiber fabrics, glass or ceramic. The coating compositions of the invention exhibit thixotropic behavior and may be applied both to horizontal and to vertical areas.

The coating compositions (C) of the invention are preferably applied to the surfaces to be coated and are allowed to cure. Curing preferably takes place at temperatures of 0 to 50° C., more preferably 10 to 40° C., under the pressure of the surrounding atmosphere (approximately 1020 hPa). Curing, however, may also take place at higher or lower pressures.

The coatings obtained after curing are notable for outstanding elasticity, high weathering stability, and good recoatability.

All of the above symbols in the above formulae have their definitions in each case independently of one another. In all formulae the silicon atom is tetravalent.

Unless indicated otherwise, all amounts and percentages in the examples below are by weight, all pressures are 0.10 MPa (abs.), and all temperatures are 20° C. The expression "% by weight" relates always, without exception, to the entire coating composition (C).

Example 1

20.0 g of GENIOSIL® STP-E10 (silane-terminated polymer P; a polypropylene glycol having end groups of the general formula (IV) where A=methylene radical, $R^1$=methyl radical, $R^2$=methyl radical, and x=2, available commercially from Wacker Chemie AG), 10.0 g of GENIOSIL® STP-E15 (silane-terminated polymer P; a polypropylene glycol having end groups of the general formula (IV) where A=propylene radical, $R^2$=methyl radical, and x=3, available commercially from Wacker Chemie AG), 23.5 g of hexadecyltrimethoxysilane, 2.0 g of vinyltrimethoxysilane, 1.0 g of hydrophobic silica (HDK® H2000; available commercially from Wacker Chemie AG), 21.0 g of aluminum trihydrate (ATH), 21.5 g of talc, and 1.0 g of 3-aminopropyltrimethoxysilane are mixed in a suitable mixing device.

A beige sealant is obtained which has a viscosity of 15,000 mPa s (Brookfield, spindle 6, 5.0 $min^{-2}$) or 4800 mPa s (Brookfield, spindle 6, 50 $min^{-2}$). From this mixture a specimen with dimensions of 255×130×2 mm is cast, and the mechanical values indicated in Table I are ascertained:

| | |
|---|---|
| Shore hardness<br>DIN 53505-A-87 | 59.0 |
| Stress values [N/mm²]<br>DIN 53504-85/standard bar S1 | |
| 50% | 1.34 |
| 100% | 1.79 |
| 150% | 2.03 |
| Tensile strength [N/mm²]<br>DIN 53504-85/standard bar S1 | 2.07 |
| Elongation at break | 166.02 |
| Tear resistance [N/mm]<br>ASTM D 624 B - 91 | 14.35 |

Example 2

20.0 g of GENIOSIL® STP-E10 (silane-terminated polymer P; a polypropylene glycol having end groups of the general formula (IV) where A=methylene radical, $R^1$=methyl radical, $R^2$=methyl radical, and x=2, available commercially from Wacker Chemie AG), 10.0 g of GENIOSIL® STP-E15 (silane-terminated polymer P; a polypropylene glycol having end groups of the general formula (IV) where A=propylene radical, $R^2$=methyl radical, and x=3, available commercially from Wacker Chemie AG), 23.5 g of phenyltriethoxysilane, 2.0 g of vinyltrimethoxysilane, 1.0 g of hydrophobic silica (HDK® H2000; available commercially from Wacker Chemie AG), 21.0 g of aluminum trihydrate (ATH), 21.5 g of talc, and 1.0 g of 3-aminopropyltrimethoxysilane are mixed in a suitable mixing device. A beige sealant is obtained which has a viscosity of 10,600 mPa s (Brookfield, spindle 6, 5.0 $min^{-2}$) or 4500 mPa s (Brookfield, spindle 6, 50 $min^{-2}$). From this mixture a specimen with dimensions of 255×130×2 mm is cast, and the mechanical values indicated in Table II are ascertained:

| | |
|---|---|
| Shore hardness<br>DIN 53505-A-87 | 55.0 |
| Stress values [N/mm²]<br>DIN 53504-85/standard bar S1 | |
| 50% | 1.03 |
| 100% | 1.79 |
| 150% | 2.35 |
| 200% | 2.54 |
| Tensile strength [N/mm²]<br>DIN 53504-85/standard bar S1 | 2.58 |
| Elongation at break | 195 |
| Tear resistance [N/mm]<br>ASTM D 624 B - 91 | 14.99 |

Example 3

20.0 g of GENIOSIL® STP-E10 (silane-terminated polymer P; a polypropylene glycol having end groups of the general formula (IV) where A=methylene radical, $R^2$=methyl radical, $R^2$=methyl radical, and x=2, available commercially from Wacker Chemie AG), 10.0 g of GENIOSIL® STP-E15 (silane-terminated polymer P; a polypropylene glycol having end groups of the general formula (IV) where A=propylene radical, $R^2$=methyl radical, and x=3, available commercially from Wacker Chemie AG), 23.5 g of isooctyltrimethoxysilane, 2.0 g of vinyltrimethoxysilane, 1.5 g of hydrolyzed tetraethyl silicate (WACKER® SILIKAT TES 40 WN; available commercially from Wacker Chemie AG), 0.5 g of hydrophobic silica (HDK® H2000; available commercially from Wacker Chemie AG), 20.0 g of aluminum trihydrate (ATH), 22.4 g of talc, and 0.1 g of (N-cyclohexylaminomethyl)triethoxysilane are mixed in a suitable mixing device. A beige sealant is obtained which has a viscosity of 15,600 mPa s (Brookfield, spindle 6, 5.0 $min^{-1}$) or 4800 mPa s (Brookfield, spindle 6, 50 $min^{-1}$). From this mixture a specimen with dimensions of 255×130×2 mm is cast, and the mechanical values indicated in Table III are ascertained:

| | |
|---|---|
| Shore hardness DIN 53505-A-87 | 64.0 |
| Stress values [N/mm²] DIN 53504-85/standard bar S1 | |
| 50% | 1.78 |
| 100% | 2.05 |
| 150% | 2.21 |
| Tensile strength [N/mm²] DIN 53504-85/standard bar S1 | |
| Elongation at break | 94 |
| Tear resistance [N/mm] ASTM D 624 B - 91 | 9.84 |

Example 4

Not Inventive 20.0 g of GENIOSIL® STP-E10 (silane-terminated polymer P; a polypropylene glycol having end groups of the general formula (IV) where A=methylene radical, $R^2$=methyl radical, $R^2$=methyl radical, and x=2, available commercially from Wacker Chemie AG), 10.0 g of GENIOSIL® STP-E15 (silane-terminated polymer P; a polypropylene glycol having end groups of the general formula (IV) where A=propylene radical, $R^2$=methyl radical, and x=3, available commercially from Wacker Chemie AG), 23.5 g of silicone resin (SILRES® SY 231; available commercially from Wacker Chemie AG), 2.0 g of vinyltrimethoxysilane, 1.0 g of hydrophobic silica (HDK® H2000; available commercially from Wacker Chemie AG), 20.5 g of aluminum trihydrate (ATH), 21.0 g of talc, and 2.0 g of 3-aminopropyltrimethoxysilane are mixed in a suitable mixing device. A beige sealant is obtained which has a viscosity of 28,400 mPa s (Brookfield, spindle 6, 5.0 $min^{-2}$) or 14,320 mPa s (Brookfield, spindle 6, 50 $min^{-2}$). From this mixture a specimen with dimensions of 255×130×2 mm is cast, and the mechanical values indicated in Table IV are ascertained:

| | |
|---|---|
| Shore hardness DIN 53505-A-87 | 71.0 |
| Stress values [N/mm²] DIN 53504-85/standard bar S1 | |
| 50% | 3.18 |
| 100% | |
| 150% | |
| 200% | |
| Tensile strength [N/mm²] DIN 53504-85/standard bar S1 | 4.06 |
| Elongation at break | 97 |
| Tear resistance [N/mm] ASTM D 624 B - 91 | 25.66 |

The invention claimed is:

1. A moisture-curing coating composition, comprising
   A) 100 parts by weight of at least one silane-terminated polymer having end groups of the formula (I)

$$-A-Si(OR^1)_xR^2_{3-x} \qquad (I),$$

B) 30 to 200 parts by weight of at least one reactive plasticizer of the formula (II), $$R^3-Si(OR^4)_yR^5_{3-y} \qquad (II),$$

C) 0 to 400 parts by weight of filler, and
   D) 0.01 to 20 parts by weight of curing catalyst,
   where
   A is a linear or branched alkylene group having 1 to 10 carbon atoms,
   $R^1$ and $R^4$ are each independently a linear or branched, unsubstituted or halogen-substituted alkyl group having 1 to 10 carbon atoms,
   $R^2$ and $R^5$ are each independently a linear or branched, unsubstituted or halogen-substituted alkyl group having 1 to 5 carbon atoms,
   $R^3$ is an aryl group or a linear, branched or cyclic alkyl group or alkenyl group having 6 to 40 carbon atoms, in which individual hydrogen atoms may be substituted by organic radicals, and, if $R^3$ is a linear, branched or cyclic alkyl group or alkenyl group, the carbon chain may be interrupted by oxygen atoms, and
   x and y are 1, 2 or 3, and
   wherein the silane-terminated polymers are polyesters, polyethers, polyalkylenes, and/or polyacrylates, and
   wherein the reactive plasticizer of formula (II) is present in an amount of at least 15% by weight relative to the total weight of the coating composition.

2. The moisture-curing coating composition of claim 1, wherein the polymer(s) comprise end groups of the formula (IV)

$$\sim O-C(=O)-NH-A-Si(OR^1)_xR^2_{3-x} \qquad (IV).$$

3. The moisture-curing coating composition of claim 1, wherein A is a propylene or methylene group.

4. The moisture-curing coating composition of claim 2, wherein A is a propylene or methylene group.

5. The moisture-curing coating composition of claim 1, which comprises at least 20 parts by weight of filler.

6. The moisture-curing coating composition of claim 1, wherein at least one filler is selected from the group consisting of aluminum trihydroxide, calcium carbonate, barium sulfate, talc, mica, kaolin, silica, quartz, heavy spar, and carbon black.

7. The moisture-curing coating composition of claim 1, wherein at least one curing catalyst is selected from the group consisting of organic titanium and tin compounds, aminosilanes, organic amines, and acidic compounds.

8. A method for sealing surfaces, comprising applying a coating composition of claim 1 to the surface to be sealed.

9. The method of claim 8, wherein the coating composition applied to the surface to be sealed is cured at temperatures from 0 to 50° C.

10. The composition of claim 1, which contains one or more aminosilanes and is free of metal-containing catalysts.

11. A moisture-curing coating composition comprising
A) 100 parts by weight of at least one condensation curable polymer consisting of silane-terminated polymer(s) terminated at each polymer terminus by end groups of the formula (I)

$$-A-Si(OR^1)_xR^2_{3-x} \qquad (I),$$

B) 30 to 200 parts by weight of at least one reactive plasticizer of the formula (V), $$R^3-Si(OR^1)_yR^2_{3-x} \qquad (V),$$

C) 0 to 400 parts by weight of filler, and
D) 0.01 to 20 parts by weight of curing catalyst, where
A is a linear or branched alkylene group having 1 to 10 carbon atoms,
$R^1$ is a linear or branched, unsubstituted or halogen-substituted alkyl group having 1 to 10 carbon atoms,
$R^2$ is a linear or branched, unsubstituted or halogen-substituted alkyl group having 1 to 5 carbon atoms,
$R^3$ is an aryl group or a linear, branched or cyclic alkyl group or alkenyl group having 6 to 40 carbon atoms, in which individual hydrogen atoms may be substituted by organic radicals, and, if $R^3$ is a linear, branched or cyclic alkyl group or alkenyl group, the carbon chain may be interrupted by oxygen atoms, and
x and y are 1, 2 or 3, and
wherein the silane-terminated polymers are polyesters, polyethers, polyalkylenes, and/or polyacrylates.

12. The moisture-curing coating composition of claim 11, wherein A is a propylene or methylene group.

13. A moisture-curing coating composition comprising
A) 100 parts by weight of at least one silane-terminated polymer having end groups of the formula (I)

$$-A-Si(OR^1)_xR^2_{3-x} \qquad (I),$$

B) 7 to 200 parts by weight of at least one reactive plasticizer of the formula (II), $$R^3-Si(OR^4)_yR^5_{3-y} \qquad (II),$$

C) 0 to 400 parts by weight of filler, and
D) 0.01 to 20 parts by weight of curing catalyst, where
A is a linear or branched alkylene group having 1 to 10 carbon atoms,
$R^1$ and $R^4$ are each independently a linear or branched, unsubstituted or halogen-substituted alkyl group having 1 to 10 carbon atoms,
$R^2$ and $R^5$ are each independently a linear or branched, unsubstituted or halogen-substituted alkyl group having 1 to 5 carbon atoms,
$R^3$ is an aryl group or a linear, branched or cyclic alkyl group or alkenyl group having 6 to 40 carbon atoms, in which individual hydrogen atoms may be substituted by organic radicals, and, if $R^3$ is a linear, branched or cyclic alkyl group or alkenyl group, the carbon chain may be interrupted by oxygen atoms, and
x and y are 1, 2 or 3,
with the proviso that at least one reactive plasticizer (RW) is selected from the group consisting of decyl-trimethoxysilane, decyltriethoxysilane, dodecyltrimethoxysilane, dodecyltriethoxysilane, tetradecyltrimethoxysilane, tetradecyltriethoxysilane, hexadecyltrimethoxsilane, hexadecyltriethoxysilane, and silanes having $C_{16}$ alkyl groups,
wherein the polymer(s) comprise end groups of the formula (IV)

$$\sim O-C(=O)-NH-A-Si(OR^1)_xR^2_{3-x} \qquad (IV).$$

14. The moisture-curing coating composition of claim 13, wherein A is a propylene or methylene group.

15. A moisture-curing coating composition, comprising
A) 100 parts by weight of at least one silane-terminated polymer having end groups of the formula (I)

$$-A-Si(OR^1)_xR^2_{3-x} \qquad (I),$$

B) 30 to 200 parts by weight of at least one reactive plasticizer of the formula (II), $$R^3-Si(OR^4)_yR^5_{3-y} \qquad (II),$$

C) 0 to 400 parts by weight of filler, and
D) 0.01 to 20 parts by weight of curing catalyst, where
A is a linear or branched alkylene group having 1 to 10 carbon atoms,
$R^1$ and $R^4$ are each independently a linear or branched, unsubstituted or halogen-substituted alkyl group having 1 to 10 carbon atoms,
$R^2$ and $R^5$ are each independently a linear or branched, unsubstituted or halogen-substituted alkyl group having 1 to 5 carbon atoms,
$R^3$ is an aryl group or a linear, branched or cyclic alkyl group or alkenyl group having 6 to 40 carbon atoms, in which individual hydrogen atoms may be substituted by organic radicals, and, if $R^3$ is a linear, branched or cyclic alkyl group or alkenyl group, the carbon chain may be interrupted by oxygen atoms, and
x and y are 1, 2 or 3, and
wherein the silane-terminated polymers are polyesters, polyethers, polyalkylenes, and/or polyacrylates,
wherein the reactive plasticizer of formula (II) is present in an amount of at least 15% by weight relative to the total weight of the coating composition, and wherein the coating composition further comprises at least one tetraalkylsilicate of the formula $$Si(OR^6)_4$$

where $R^6$ is a linear or branched, optionally halogenated alkyl group having 1-10 carbon atoms, or a partial hydrolysate thereof, or mixture thereof.

16. The coating composition of claim 15, wherein the tetraalkylsilicate, partial hydrolysate thereof, or mixture thereof is present in an amount of 0.01 to 20 weight percent based on the weight of the coating composition.

17. A moisture-curing coating composition, comprising
A) 100 parts by weight of at least one silane-terminated polymer having end groups of the formula (I)

$$-A-Si(OR^1)_xR^2_{3-x} \qquad (I),$$

B) 30 to 200 parts by weight of at least one reactive plasticizer of the formula (II), $$R^3-Si(OR^4)_yR^5_{3-y} \qquad (II),$$

C) 0 to 400 parts by weight of filler, and
D) 0.01 to 20 parts by weight of curing catalyst, where
A is a linear or branched alkylene group having 1 to 10 carbon atoms, R¹ and R⁴ are each independently a linear or branched, unsubstituted or halogen-substituted alkyl group having 1 to 10 carbon atoms, R² and R⁵ are each independently a linear or branched, unsubstituted or halogen-substituted alkyl group having 1 to 5 carbon atoms, R³ is an aryl group or a linear, branched or cyclic alkyl group or alkenyl group having 6 to 40 carbon atoms, in which individual hydrogen atoms may be substituted by organic radicals, and, if R³ is a linear, branched or cyclic alkyl group or alkenyl group, the carbon chain may be interrupted by oxygen atoms, and x and y are 1, 2 or 3, and wherein the silane-terminated polymers are polyesters, polyethers, polyalkylenes, and/or polyacrylates, wherein the reactive plasticizer of formula (II) is present in an amount of more than 10% by weight relative to the total weight of the coating composition, and wherein a filler is present, and the filler comprises aluminum trihydrate and/or talc.

18. A moisture-curing coating composition, comprising

A) 100 parts by weight of at least one silane-terminated polymer having end groups of the formula (I)

  (I),

B) 30 to 200 parts by weight of at least one reactive plasticizer of the formula (II),

  (II),

C) 0 to 400 parts by weight of filler, and

D) 0.01 to 20 parts by weight of curing catalyst, where

A is a linear or branched alkylene group having 1 to 10 carbon atoms,

R¹ and R⁴ are each independently a linear or branched, unsubstituted or halogen-substituted alkyl group having 1 to 10 carbon atoms, R² and R⁵ are each independently a linear or branched, unsubstituted or halogen-substituted alkyl group having 1 to 5 carbon atoms, R³ is an aryl group or a linear, branched or cyclic alkyl group or alkenyl group having 6 to 40 carbon atoms, in which individual hydrogen atoms may be substituted by organic radicals, and, if R³ is a linear, branched or cyclic alkyl group or alkenyl group, the carbon chain may be interrupted by oxygen atoms, and x and y are 1, 2 or 3, and wherein the silane-terminated polymers are polyesters, polyethers, polyalkylenes, and/or polyacrylates, wherein the reactive plasticizer of formula (II) is present in an amount of at least 15% by weight relative to the total weight of the coating composition, and wherein in at least one first silane-terminated polymer of formula (I), A is a methylene group, and in least one second silane-terminated polymer of the formula (I), A is a propylene group, wherein at least 40 mol percent of the total of first and second silane-terminated polymers are first silane-terminated polymers.

* * * * *